US005468355A

United States Patent [19]

Shefer et al.

[11] Patent Number: 5,468,355

[45] Date of Patent: Nov. 21, 1995

[54] METHOD FOR PRODUCING RADIOISOTOPES

[75] Inventors: Ruth E. Shefer, Newton; Robert E. Klinkowstein, Winchester; Barbara J. Hughey, Lexington, all of Mass.; Michael J. Welch; Carmen S. Dence, both of St. Louis, Mo.

[73] Assignees: Science Research Laboratory, Somerville, Mass.; Washington University, St. Louis, Mo.

[21] Appl. No.: 72,277

[22] Filed: Jun. 4, 1993

[51] Int. Cl.$^{6}$ .......... B01D 5/00

[52] U.S. Cl. .......... 204/157.2; 423/2; 376/195; 376/201; 204/157.21

[58] Field of Search .......... 423/2; 252/645; 376/195, 201; 204/157.2, 157.21; 422/148, 159, 186

[56] References Cited

U.S. PATENT DOCUMENTS

| | | | |
|---|---|---|---|
| 4,752,432 | 6/1988 | Bida et al. | 376/195 |
| 4,941,956 | 7/1990 | Arai et al. | 204/157.2 |
| 5,247,177 | 9/1993 | Goldberg et al. | 250/358.1 |
| 5,280,505 | 1/1994 | Hughey et al. | 376/156 |

OTHER PUBLICATIONS

Austin, S. M. et al., "A Batch Process for the Production of $^{13}$N—labeled Nitrogen gas", Nuclear Inst. & Methods, vol. 126, (1975) 373–379.

*Int. J. of Appl. Radiation and Isotobes,* G. S. McNaughton and R. D. More, vol. 30, pp. 489–492, Pergoman Press Ltd, 1979 (Article recd. Dec. 29, 1978).

"Short–lived Radioactive Gases for Clinical Use"— J. C. Clark, BSc and P. D. Buckingham, Aist (Buttersworth, London and Boston, 1975, pp. 179–187.

"Development and Evaluation of Facilities for the Efficient Production of Compounds Labeled with Carbon–II and Oxygen–15 " at the Washington University Medical Cyclotron—by Bruce W. Weiland The Ohio State University, 1973, Prof. Donald D. Glower, Adviser, pp. 42–50, 52, 54–58.

A Trap for the Removal of Nitrogen Oxides from Carbon–II Carbon Dioxide—Timothy J. Tewson, William Banks, Mark Franceschini and Joan Hoffpauir, J. of Applied Radiation and Isotopes, vol. 40, No. 9, pp. 765–768, 1989.

*Primary Examiner*—Ngoclan Mai

*Attorney, Agent, or Firm*—Wolf, Greenfield & Sacks

[57] ABSTRACT

A target is bombarded with high energy particles to generate a radioisotope, and the radioisotope is preferably extracted by one of the following: combusting the target in oxygen, stopping the bombardment and heating the target, or heating the target by induction. Bombardment may take place through a windowless path, and the radioisotope may be used for PET. The particles used may be deuterons or protons, and $^{13}$N may be generated. $^{11}$C may also be generated from either $^{11}$B or $^{10}$B using protons or deuterons. Combustion may be performed by induction heating and may be controlled by the quantity of oxygen available or the temperature. Combustion may be primarily confined to a surface layer and the target may be reused. The beam energy may be 2.2 MeV or less. Another general aspect includes trapping the oxides of $^{13}$N in a trap. The oxides may be converted into $^{13}$N-Ammonia, and this conversion may take place in the trap, which trap may comprise silica gel and sodium hydroxide and may also contain a reducing agent such as Raney-Nickel.

44 Claims, 5 Drawing Sheets

METHOD FOR PRODUCING RADIOISOTOPES

GOVERNMENT RIGHTS

This patent application concerns an invention in connection with which an agency of the U.S. Government has provided a grant which may provide government rights in the invention. The National Heart, Lung and Blood Institute has provided support through the Small Business Innovation Research Program under Contract Grant No. SSS-X (89) 1 R43 HL48969-01.

FIELD OF THE INVENTION

The invention relates to the synthesis of radiochemicals, such as for use in positron emission tomography (PET), and more particularly to the synthesis of $^{13}$N-ammonia for use as a blood flow agent.

BACKGROUND OF THE INVENTION

A number of non-invasive methods of examining internal bodily organs, or sections of such organs, have become popular for diagnosing a variety of illnesses. One of these-techniques is called Positron Emission Tomography (PET) or Positron Emission Transaxial Tomography (PETT). In this method of developing internal bodily images, an array of sensors detects gamma rays emitted from tissues after the subject has been administered a natural biochemical substance (for example, gases, glucose or fatty acids) into which positron-emitting radio-isotopes have been incorporated. A computer calculates the paths of the gamma rays (which result from collisions of positrons and electrons) and interprets the data to generate a tomographic image. The resultant tomogram represents local concentrations of the isotope-containing substance in the tissues. By proper choice of isotope-containing substances, various processes such as brain function, local blood flow, blood volume and other metabolic processes can be studied.

The short-lived radio-isotopes are administered by intravenous injection or by having the subject inhale a gas containing small quantities of the radio-isotope. Isotopes which are often incorporated into such gases or injections are carbon-11, nitrogen-13, oxygen-15 and fluorine-18. In present PET facilities, these radioisotopes are derived from boron, oxygen or carbon, nitrogen, and oxygen or neon targets, respectively, by bombarding the targets with high-energy protons or deuterons obtained from a particle accelerator.

In recent years, the need for radioisotope sources has been addressed in two ways: through the development of lower cost, automated accelerator systems with multiple radioisotope and pharmaceutical production capabilities, and through the development of specialized single isotope, single pharmaceutical delivery systems. In cyclotron-based systems, nitrogen-13 is typically produced via the $^{16}O(p,\alpha)^{13}N$ reaction in liquid $H_2{}^{16}O$ or via this reaction in combination with the $^{13}C(p,n)^{13}N$ reaction in a water and charcoal slurry.

Producing radioisotopes for PET is further described in U.S. Pat. No. 4,812,775, granted on Mar. 14, 1989 and entitled ELECTROSTATIC ION ACCELERATOR, herein incorporated by reference.

Ruben et al. have reported the extraction of nitrogen-13 from irradiated graphite for biological studies as early as 1940. Varner and co-workers have bombarded thin graphite targets with deuterons and extracted the nitrogen-13 in acid. Clark and Buckingham report the extraction of $^{13}$N as $^{13}$NN via oxidation with carbon dioxide sweep gas, while Darquennes et al. have shown that $^{13}$NN can be extracted using nitrogen as a sweep gas at a temperature of 1880° C. Both the approach of Clark and Buckingham and that of Darquennes et al. produce primarily $^{13}$NN.

Rubidium-82, another agent that can be used to measure myocardial blood flow, is generator produced. The column containing the parent radionuclide, $^{82}$Sr, is quite expensive and generally must be replaced on a monthly basis. A computer controlled infusion system is also needed to administer the nuclide.

SUMMARY OF THE INVENTION

In general, the invention features bombarding a target with high energy particles to generate a radioisotope, and preferably extracting the radioisotope by one of the following: combusting the target in oxygen, stopping the bombardment and heating the target, or heating the target by induction. Bombardment may take place through a windowless path, and the radioisotope may be used for PET. The particles used may be deuterons or protons, and $^{13}$N may be generated. $^{11}$C may also be generated from either $^{11}$B or $^{10}$B using protons or deuterons. Combustion may be performed by induction heating and may be controlled by the quantity of oxygen available or the temperature. Combustion may be primarily confined to a surface layer and the target may be reused. The beam energy may be 2.2 MeV or less. A "high energy particle", in this application, is intended to mean a particle raised to an energy above room temperature by an accelerator or the like.

In another general aspect, the invention features trapping oxides of $^{13}$N in a trap. Following trapping, the activity can be washed off (e.g., with distilled water) and reduced by conventional techniques to produce $^{13}$N-Ammonia. A trap can also be made to contain both a trapping agent and a reducing agent, which allows the synthesis of $^{13}$N-Ammonia to take place in the trap. The trap may comprise silica gel and sodium hydroxide, and the reducing agent may be Raney-Nickel.

In a further general aspect, the invention features apparatus for generating the oxides of $^{13}$N including a source of particles and a carbon-containing target positioned in the chamber which is irradiated by the particles generated by the source. An oxygen source is also connected to the chamber to provide oxygen in the chamber.

The generation of $^{13}$N-ammonia according to the invention has the advantage that it can be carried out inexpensively by a machine having a relatively small footprint and requiring little regular maintenance. Indeed, only a relatively low energy (i.e., 2.2 MeV or less) deuteron beam is needed, which may be generated with a relatively compact and inexpensive accelerator. This energy requirement is achieved in part because the method of the invention does not require the use of a window in the path of the particle beam. The combustion process also yields oxides of $^{13}$N, which are good starting materials for the synthesis of $^{13}$N-Ammonia. Furthermore, because the target is heated under controlled conditions, it may be reused, reducing maintenance costs. Similarly, the trap may be reused, and the combined trap-synthesis system is easy to maintain. A system according to the invention may even be mounted in a trailer for mobile use. All of these factors should contribute to making PET more readily available and less expensive.

DESCRIPTION OF THE PREFERRED EMBODIMENT

Figure 1:
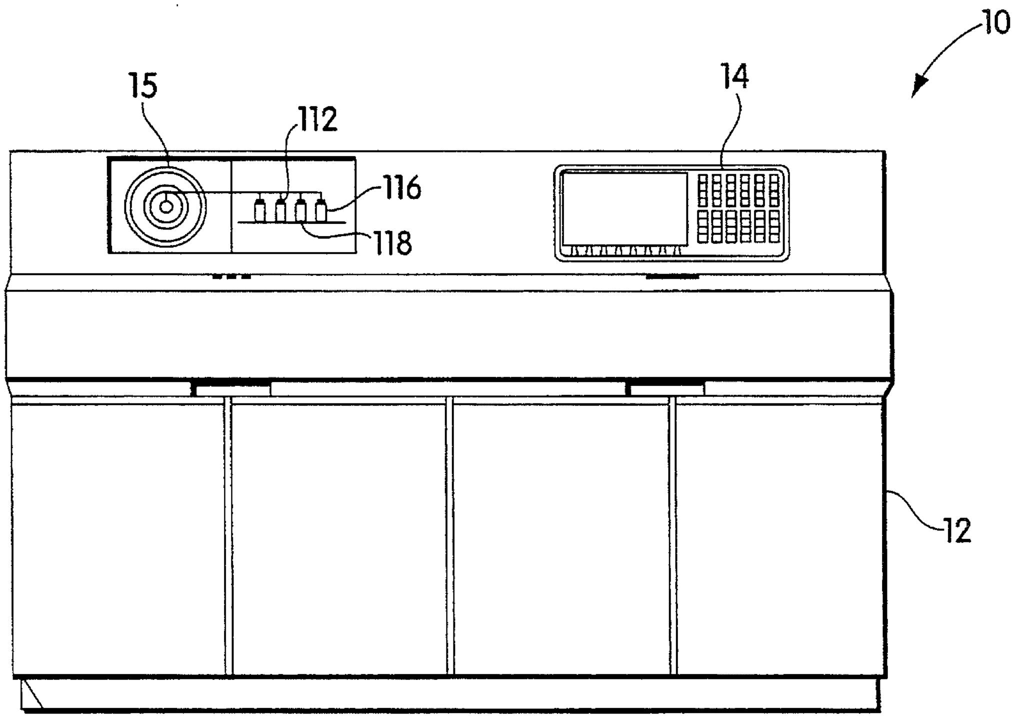
FIG. 1 is a front view of a radioisotope generating system according to the invention.
Figure 2:
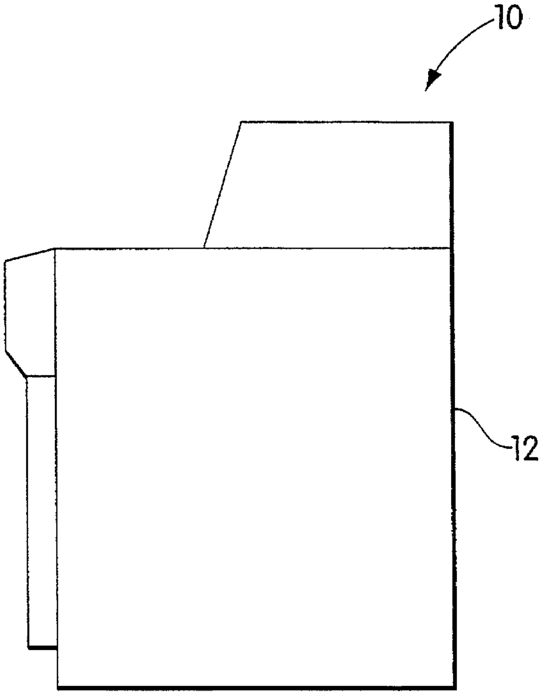
FIG. 2 is a side view of the system of FIG. 1.

Referring to FIGS. 1 and 2, a radioisotope generating system 10 according to the invention may include an enclosure 12 that is, for a preferred embodiment, approximately the size of an office photocopier. This enclosure presents the user with a control unit 14, which allows him or her to control the system, reagent source vessels 112, 116, 118, which hold various solutions required for system operation, and a collecting station 15, which supplies the generated radioisotope into a product collector 106. Once filled with the radioisotope generated by the radioisotope generation system, its contents may be administered to the patient, and a diagnostic PET imaging system (not shown) may be used to observe and diagnose the patient.

Figure 3:
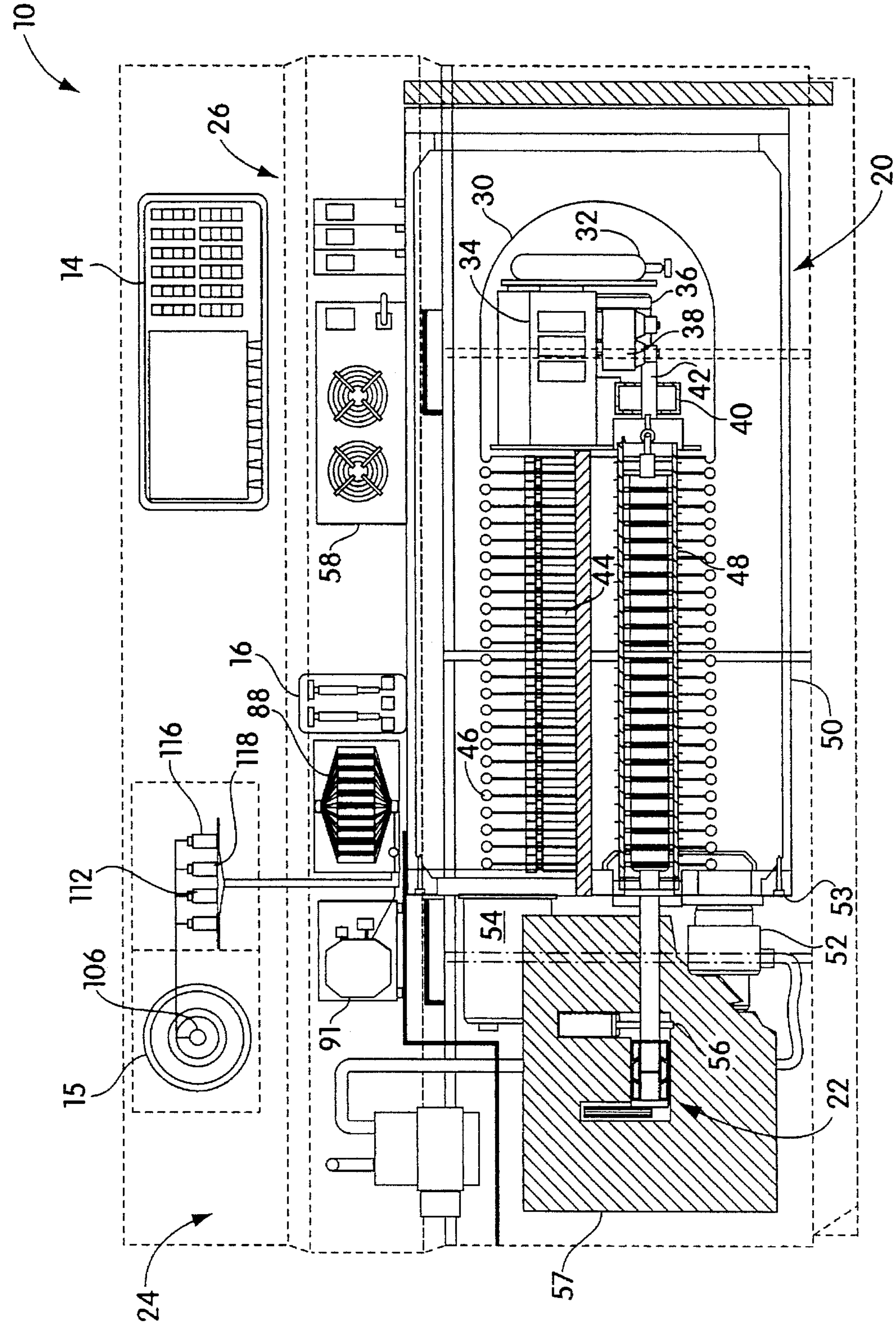
FIG. 3 is a front view of the system of FIG. 1, with the accelerator and target shown in cross-section and the covers of the enclosure shown in phantom to reveal the remaining sub-systems.

Referring to FIG. 3, the radioisotope generating system 10 is made up of four general sub-systems. These include a high-energy particle source 20, such as a coaxial cascade accelerator (CCA), a shielded target assembly 22, a chemistry system 24, and control electronics 26. For a preferred embodiment, the CCA is a 1.2 MV accelerator capable of delivering up to 1 mA of deuteron current. The design parameters of the major accelerator subsystems for this embodiment are summarized in Table I and are described in the following paragraphs.

TABLE I

| | |
|---|---|
| Maximum Terminal Voltage | 1.25 MV |
| Maximum Current | 1000 μA |
| Operating Current | 220 μA |
| $D^+$ Fraction | 95% |
| Total Electrical Power | |
| Ion Source | 330 W |
| HV Power Supply | 1.5 kW (nominal) |
| Pressure Vessel | |
| Length | 1.5 m |
| Diameter | 0.7 m |
| $SF_6$ Pressure | 95 psia |
| Overall Length | 1.9 m |
| Approximate Weight | 600 lb |

The accelerator includes a high voltage terminal 30, a deuterium gas vessel 32, and probe and focus power supplies 34. The accelerator also includes an alternator 36, an RF oscillator 38, an RF ion source 40. It further includes a high voltage power supply 44, high voltage hoops 46 and an accelerating tube 48. A pressure vessel 50 holds these components, which may be evacuated via a turbo pump 52. Mounted on the grounded end flange of the CCA are a transformer 54, a motor 55, and a gate valve 56.

The RF ion source 40 is commercially available from, for example, Vivirad High Voltage Corporation of Billerica, Mass. In this source, $D^+$ ions are generated in a plasma discharge produced by coupling RF energy at 140 MHz into a $D_2$ gas-filled pyrex chamber 42 via two electrodes. The beam is extracted through an insulating quartz canal placed between the discharge and the extraction electrode. The canal is the only source component which requires routine maintenance. Replacement of the canal is recommended after 1000 hours of continuous source operation. The RF ion source requires approximately 330 W of electrical power during operation. Electrical power will be provided by the alternator 36 in the high voltage terminal 30 with an insulating rotating shaft connected to the electrical motor 55 at ground potential.

The ion source 40 is rated for a maximum current ($H^+$ or $D^+$) of 1–2 mA. An important operating feature of the RF ion source is its high $D^+$ to $D_2^+$ fraction A high $D^+$ fraction reduces the total current which must be accelerated since the $D_2^+$ component will have half the energy per nucleon and will not contribute significantly to $^{13}N$ production in the target. The $D^+$ fraction, measured on an identical source, was 95%. Therefore, a total accelerated current of 22 μA will be required to deliver 210 μA of $D^+$ to the target.

The CCA utilizes a patented symmetrical, series-fed cascade multiplier high voltage 1.2 MV power supply developed at Science Research Laboratories. This type of power supply is discussed in U.S. Pat. No. 5,008,800, granted on Apr. 16, 1991 and entitled HIGH VOLTAGE POWER SUPPLY. CCAs are discussed in U.S. Pat. No. 5,135,704, granted on Aug. 4, 1992 and entitled RADIATION SOURCE UTILIZING A UNIQUE ACCELERATOR AND APPARATUS FOR THE USE THEREOF. The 1.2 MV power supply comprises 24 identical 50 kV rectifier stages mounted directly onto the accelerating column. The compact geometry of the multiplier is made possible by the use of miniaturized solid-state high voltage components which allow the multiplier to operate with the same axial voltage gradient as the accelerating tube Two RF generators operating 180° out of phase supply power to the input of the multiplier circuit via a low inductance transformer 54 mounted on the grounded end-flange 53 of the CCA. Voltage regulation under load is maintained automatically by feedback control of the terminal voltage from the RF oscillator circuit. The RF excitation voltage for the multiplier is supplied by an all-solid-state 2 kW, air-cooled driver module 58. The driver is housed in a separate chassis with dimensions 48×22×58 $cm^3$. Transient protection circuitry is also provided for these supplies.

The accelerating tube 48 is a high gradient vacuum accelerating tube such as the ones available from Vivirad High Voltage Corporation of Billerica, Mass. The tube consists of a bonded aluminum electrode and borosilicate glass insulator assembly with an outer diameter of 11.5 cm and an internal beam aperture diameter of 3.0 cm. The tube is 79.1 cm in length and is rated for a maximum operating voltage of 1.25 MV. In order to produce a uniform potential gradient along the tube, the tube electrodes are connected externally by metal film resistors mounted in the $SF_6$ insulating gas. Overvoltage protection is provided by manufacturer-supplied spark gaps between each tube electrodeN A vacuum pressure of better than $1\times10^{-5}$ torr is maintained within the tube with the 240 liter/see turbomolecular pump 52 mounted to the grounded end-flange 53 of the CCA.

The CCA accelerating tube 48 and high voltage power supply 44 are coaxial and surrounded by the high voltage aluminum hoop structure 46 and mounted inside the aluminum pressure vessel 50 in 95 psia of $SF_6$ insulating gas. The purpose of the hoop structure is to minimize both the radial electric field stress between the column and the grounded pressure vessel 50 walls and the axial electric field stress along the column. The accelerator high voltage terminal 30 is surrounded by a smooth aluminum electrode which forms the boundary of the equipotential volume which houses the source, generator and associated electronics. The dimensions of the hoops, terminal electrode and pressure vessel have been chosen so that the maximum average electric field stress on the column does not exceed 150 kV/cm. The components of the accelerating column are mounted on an insulating support beam which is cantilevered from the end-flange of the CCA. The column is surrounded by the cylindrical aluminum pressure vessel 50.

Figure 4:
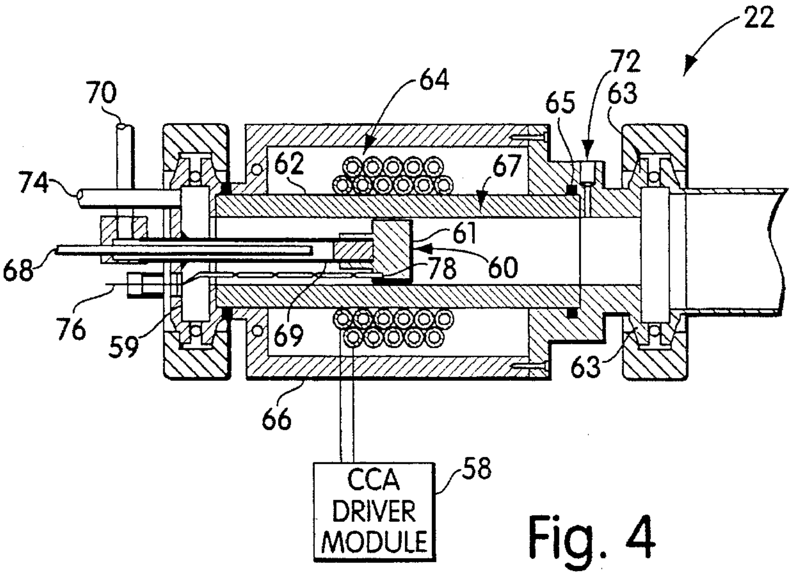
FIG. 4 is an enlarged cross-section of the system of FIG. 1 in the vicinity of the target.

Referring to FIG. 4, the target assembly 22 includes a carbon containing target 60, such as graphite target, mounted within a tube 62 made of a non-electrically conducting material, such as ceramic or fused silica. An RF induction coil 64 surrounds the ceramic or silica tube in the vicinity of the target. A cooling jacket 66 surrounds the coil, and a water inlet 68 and a water outlet 70 convey cooling water past the rear of target. A gas inlet 72 and a gas outlet 74 allow for the introduction of oxygen in the ceramic or silica tube and the removal of the products of combustion. An electrical feedthrough 76 holds wires leading to a thermocouple 78 mounted on the target.

Fused silica may be a preferred material for the tube, since the thermal expansion coefficient of fused silica is relatively low, and thus should resist cracking due to thermal gradients. Fused silica has the added advantage of a high transmission coefficient for IR light. The peak wavelength emitted from a radiating object at 1090° C. is 2.1 μm. Fused silica transmits greater than 90% of incident radiation up to 2.2 μm, and continues to transmit radiation up to 4.5 μm with an average transmittance of about 30%. Therefore a fused silica tube surrounding the target will not reach as high a temperature as might a ceramic tube. The ceramic or fused silica tube is surrounded by the water-cooled aluminum jacket 66 whose inner surface is coated with a good IR absorber and contains the cooling water. This configuration facilitates effective radiative cooling of the target 60 during bombardment because all surfaces surrounding the target will be maintained close to ambient temperature. The cooling jacket also serves to thermally protect the neutron shielding material 57 (see FIG. 3) which surrounds the target during operation.

The target chamber 67 encloses the target and comprises the fused silica tube 62 (10 cm long×2.9 cm OD) which is surrounded by the twelve turn teflon-insulated, water-cooled copper induction coil 64 and is mounted within the water cooled aluminum tube 66. The ceramic or fused silica tube is mated to standard vacuum flanges 63 (ISO-KF40) at each end through piston type O-ring seals 65. A target 2 cm in diameter and up to 2 cm thick can be accommodated in the geometry described. The target 60 is mounted to a threaded stainless steel stem 69 that is welded to a standard end-cap 59. The end-cap forms the end of the chamber. The stem is constructed from two concentric, thin-walled stainless steel tubes to allow cooling water to flow to the base of the target during irradiation. Electrical feedthroughs 76 for thermocouple wires are provided in the target end-cap, allowing the target temperature to be monitored during testing.

Experiments have shown that approximately 750 W of RF power at 30 kHz are required to energize the coil 64 and rapidly heat a graphite target 60 to combustion temperatures. The CCA driver module 58 provides a convenient source of RF power for this purpose. Circuitry may switch the driver oscillator frequency from its normal operating value of 20 KHz to the higher 30 KHz frequency required for efficient coupling of the RF magnetic field produced by the coil to the graphite target. The required RF heating power of 750 W is well within the maximum 2 kW rating of the driver module.

Efficient coupling of the RF energy to the target 60 is achieved by maximizing the fraction of the coil cross-section occupied by the target. Thermal contact between the target and the stainless steel is enhanced with a heat transfer agent (Watlube, available from the Watlow Electric Co.). The thermocouple 78 is a type K thermocouple (chromel-alumel), which was chosen because of its high oxidation resistance. Two types of graphite have been tried: ECL graphite, a high purity, medium grain size graphite with a density of 1.68–1.74 gm/cm$^3$ and ZL-3 graphite, an ultra low-porosity graphite with a density of 1.78 gm/cm$^3$. Both types were obtained from the UCAR Carbon Company. As discussed below, the latter was preferred.

The target 60 is connected to the accelerator beamline through a pneumatically-actuated gate valve 56 (see FIG. 3). The inlet and outlet connections 72, 74 for $O_2$ gas are provided directly downstream of the gate valve and at the target end-cap respectively. In this way, the $O_2$ gas flow can be directed at the front face 61 of the target during combustion. Provisions for evacuation of the target chamber and O2 gas line prior to opening of the gate valve are provided by a connection to the foreline pump of the accelerator turbomolecular pump through an electronically actuated valve. The entire system is shielded to reduce exposure of personnel to neutrons and gamma rays to below acceptable occupational safety levels.

Figure 5:
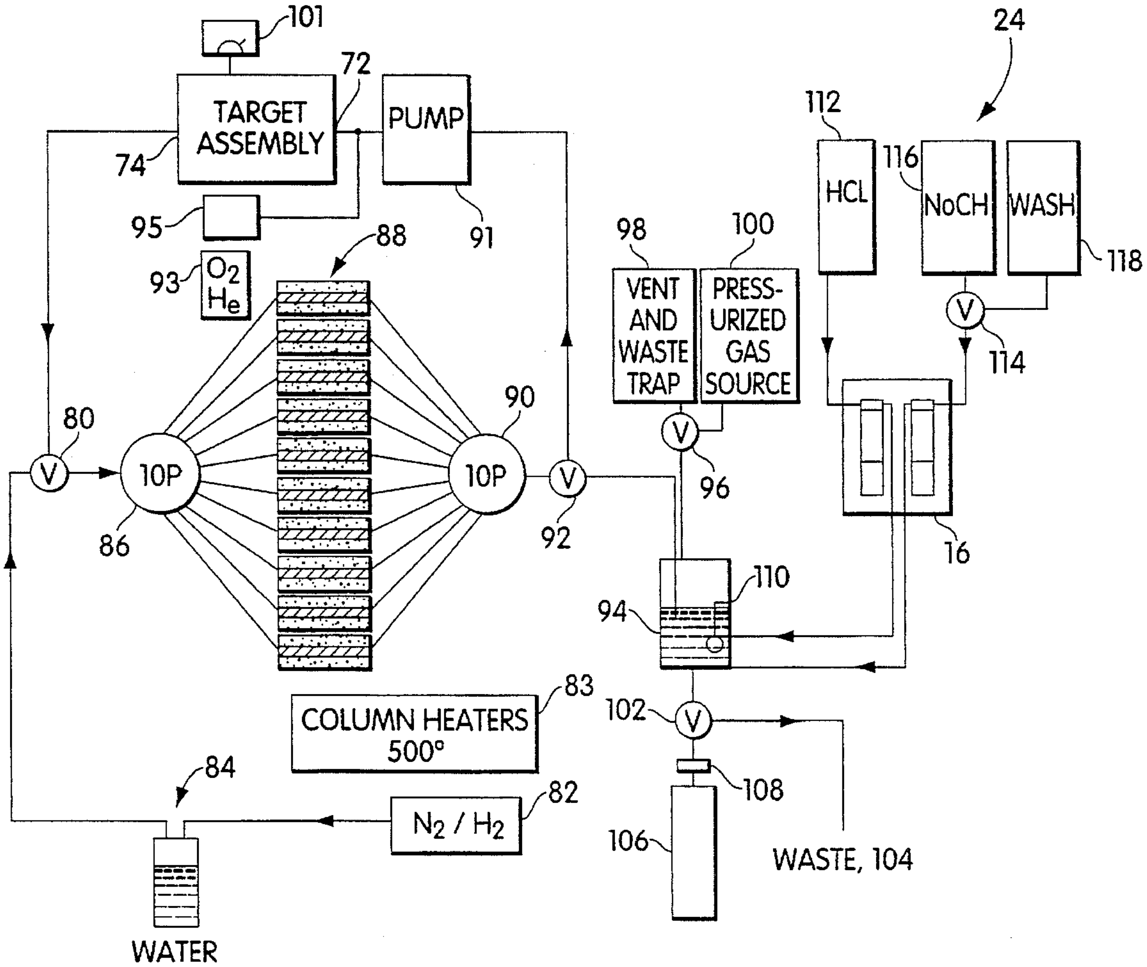
FIG. 5 is a schematic diagram for the chemistry subsystem of the system of FIG. 1.

Referring to FIG. 5, the chemistry system 24 is connected to receive the products of combustion from the target via the gas outlet 74. This output is directed to a first three-position valve 80, which may be computer controlled. This three-position valve also receives 5% hydrogen in nitrogen, from a hydrogen and nitrogen source 82, which is saturated with water by a water saturation vessel 84. The output of the 3-way valve is provided to a first ten-position valve 86, which may be computer controlled (VICI).

The ten outputs from the ten-position valve are each provided to one of ten trapping/synthesis cartridges 88. Each of these cartridges may contain a catalyst, such as Raney-Nickel, and a trapping medium, such as silica gel-with a 5% sodium hydroxide modifier (Fisher SF 254–500 dilution). Ten column heaters 83 capable of reaching 400° C. in 3 minutes are placed in proximity to these cartridges. These are tubular heaters with embedded J-type thermocouples and are controlled with a computer controlled digital transmitter available from Omega Engineering, Inc., of Stanford, Conn.

A second ten-position valve 90 is also connected to each of the cartridges and provides its output to a second three-position valve 92. The output of the second three-position valve is provided to the gas inlet 72 of the target assembly. A receiver 94 is connected to the second output of the second three-position valve. This receiver is also connected to a third three way valve 96, which is in turn connected to a vent and waste trap 98 and a pressurized gas source 100. The receiver is further connected to a fourth three-position valve 102, which is in turn connected to a waste output 104, and a product collector 106 via a filter 108.

A pH electrode 110 is housed within the receiver, to measure the pH of the contents of the receiver. The dispensing station 16 is connected to a hydrochloric acid source 112, and a fifth three-position valve 114, which is in turn connected to a sodium hydroxide source 116 and a wash source 118. The dispensing station 16 is also connected to the receiver 94. Referring again to FIG. 1, the solution sources 112, 116, 118, are placed in an accessible location on the apparatus, making refilling operations for the solution sources easy to perform.

A peristaltic pump 91 is connected to the target assembly 22 in such a manner that it may circulate combustion products out of the chamber 67. An oxygen source 93 is connected to the target assembly for supplying oxygen to the system via a metering valve 95. The metering valve may be a flow meter, or its function may be satisfied by a pressure gauge 101 connected to the chamber. When oxygen is introduced in the system, it may be preferable to add helium at the same time, to near atmospheric pressure and to prevent leakage in the cartridges.

Referring to FIGS. 3–5, the control electronics 26 include a low voltage power supply and control circuitry, which is connected to the operator control panel 14. The control electronics are connected to various sensors within the system, such as the thermocouple 78 and the pressure gauge 101. The control electronics are further connected to various system actuators, such as pumps and valves. This subsystem orchestrates the various operations performed by the radioisotope generating system 10.

The control circuitry may include a microprocessor-based control system which can be used either as a stand-alone unit or in conjunction with a host computer. Use of the stand-alone unit will permit operation of the $^{13}N$-ammonia generator from the patient bedside, from the PET scanner control room, or from any other convenient location. Alternatively, the control unit can be installed in the ammonia generator cabinet itself as shown in FIG. 3. Operation from a remote host computer will allow direct control of the system from the PET scanner control console.

The control system may be based on a commercially available communications-based process control interface such as the Omega OM-900, available from Omega Engineering, of Stamford, Conn. An on-board 8088 microprocessor enables this system to be pre-programmed to operate in an unassisted stand-alone mode or in conjunction with a host computer through an RS232/422/485 or IEEE 488 communications port. The system is compatible with direct interface to industry standard transducers for temperature, pressure, and flow measurements, and can provide control via analog and digital I/O and electro-mechanical relays.

In a fully automated $^{13}N$-ammonia generator, the microprocessor control system will perform a fixed sequence of operations including initiation of target irradiation, termination of irradiation when the required radioisotope yield is reached, and control of the steps required for the extraction of activity from the target and conversion to $^{13}N$-ammonia.

Figure 7:
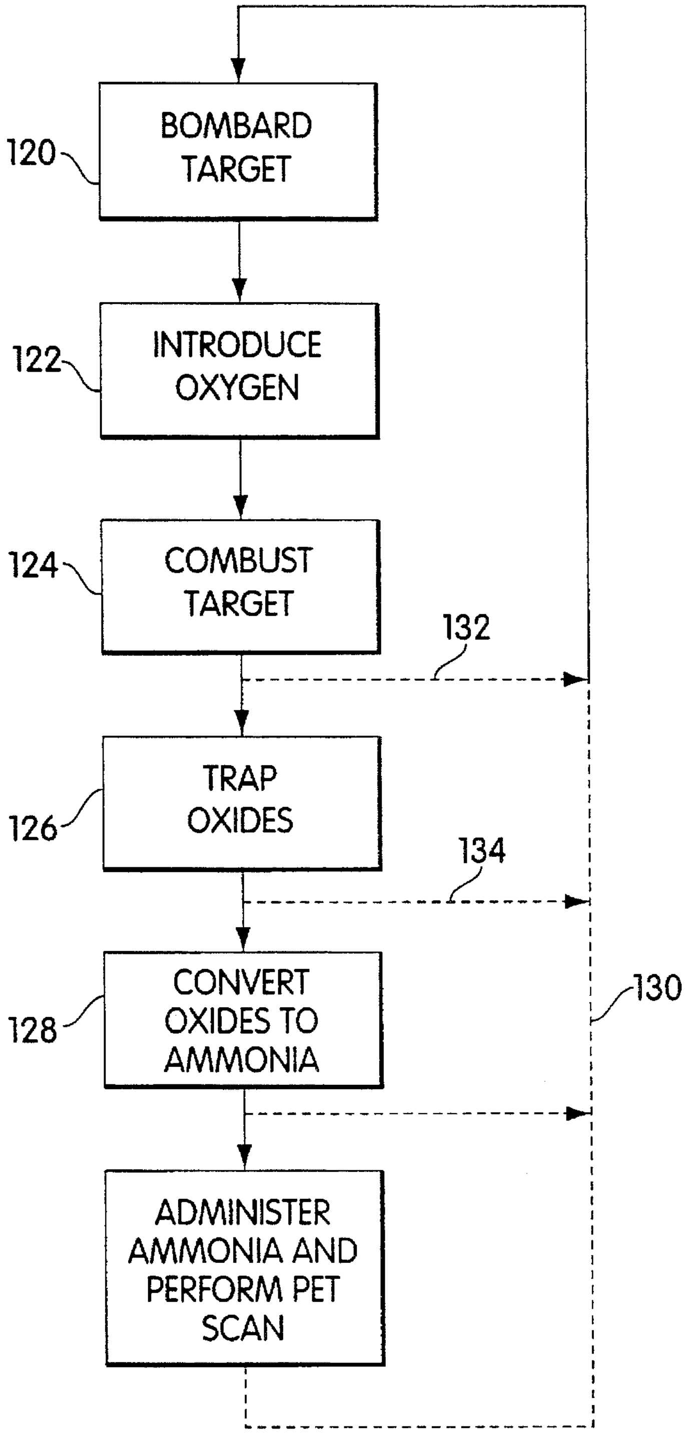
FIG. 7 is a flow chart illustrating the operation of the system of FIG. 1.

In operation of the presented embodiment, referring also to FIG. 7, the accelerator 20 accelerates deuterons produced in the RF ion source 40 and causes them to collide with the target 60 (step 120). This bombardment lasts for a preselected time period, for example, 20 minutes, and creates $^{13}N$ in the surface layer of the target via the $^{12}C(d,n)^{13}N$ nuclear reaction, which has a relatively low threshold energy (0.33 MeV) and a high yield at low bombarding energies. The depth of the layer in which $^{13}N$ is produced is dependent on the bombarding energy with which the deuterons strike the target. During this bombardment operation, the chamber 67, which surrounds the target, is evacuated.

Once the target 60 has been bombarded, a fixed amount of oxygen is supplied to the chamber from an oxygen source 93 via the target chamber gas inlet 72 (step 122). This fixed amount is determined by the metering valve 95, which is controlled by the control electronics. The metering valve may operate to control the quantity or partial pressure of the oxygen supplied to the target, and thereby control the rate and extent of combustion.

The RF induction coil 64 is then energized at 30 kHz by the CCA driver module 58, which causes the target to heat up and combust due to Joule heating by eddy currents induced in the target (step 124). The introduction of the oxygen and the combustion may overlap in time to some extent. The temperature in the chamber is monitored by the thermocouple 78, and this value is used to control the target temperature in the chamber by controlling the driver module current to the coil. The peristaltic pump 91 circulates the products of combustion out of the target chamber, through the first three-position valve 80, through one of the branches of the first ten-position valve 86, through one of the cartridges 88, through one of the branches of the second ten-position valve, and through the second three-position valve 92 back to the target chamber.

During combustion, the pump 91 continuously circulates the products of combustion around this loop. Because the flow is directed at the front face 61 of the target and the oxygen available to the target is limited, only the outer surface of the front face is combusted significantly during this process. By adjusting the amount of oxygen available in the combustion process via the metering valve 95, it is possible to combust little more than the layer which contains the $^{13}N$. Experiments have demonstrated that greater than 99% of the $^{13}N$ activity produced by target irradiation with 1.2 MeV deuterons can be extracted by combustion of a 25 μm thick graphite layer. This allows the target to be reused many times.

At the end of the combustion, which lasts approximately 1½ minutes, the first 80 and second 92 three-position valves are switched to disconnect the cartridges 88 from the target chamber 67. The first three-position valve is placed in a position that allows it to receive the hydrogen and nitrogen mixture from the hydrogen and nitrogen source 82 via the water saturation vessel 84. The second three-position valve connects the output of the second ten-position valve 90 to the receiver 94.

During the first stage of operation, where the products of combustion are recirculated through the target chamber 67, the oxides of nitrogen are trapped in the selected one of the cartridges 88 (step 126). This trapping is performed by the silica gel and sodium hydroxide trapping medium in the selected cartridge. During the second phase of operation, the column heaters heat the selected cartridge, and the Raney-Nickel catalyst in the selected cartridge catalyzes the synthesis of $^{13}N$-ammonia from the oxides of $^{13}N$ (step 128). Note that the silica gel and sodium hydroxide trapping medium and the Raney-Nickel are mixed together in the cartridge. The trapping and converting operations may therefore also overlap in time to some extent.

The receiver 94 contains about 1 ml of 0.1N HCl, which is supplied by the hydrochloric acid source 112 via the dispensing station 16. Sodium hydroxide may also be supplied from the sodium hydroxide supply 116 via the fifth three-position valve 114 and the dispensing station 16 to the receiver to adjust the pH in the receiver. This adjustment of the pH is monitored and controlled by the control electronics 26, which are responsive to the pH electrode 110.

At the end of the synthesis step, the receiver will contain a solution including $^{13}NH_3$. The fourth three-position valve 102 may then supply this solution to the product collector 106 via the filter 108 under the influence of pressurized gas in the pressurized gas source 100. The product collector may be a syringe, which can be used directly to administer the product to the patient for performing PET imaging. It is observed that the third three-position valve 96 is left in a position which allows any radioactive gas which might not dissolve within the receiver to pass into the vent and waste trap 98. This vent and waste trap traps any such residue and prevents it from being released into the room.

Once a dose of the radioisotope has been produced, the system is flushed. This is done by switching the fifth three-position valve 114 into a position that allows a washing agent from the washing agent source 118 to flow into the receiver, and by opening the fourth three-position valve 102 in a position that permits the wash to be directed to the waste disposal 104. Also, the ten-position valves 86, 90 are repositioned to select a further unspent cartridge 88 for the next isotope generation operation. After each cartridge has been used once, the ten cartridges are replaced with ten unspent cartridges.

The process may be repeated after full production of a batch of the radio isotope (step 130). Alternatively, the bombardment process may be started for a next batch (step 132, 134) soon after the combustion process has ended for the current batch. This parallel operation may permit a higher output from the system.

EXAMPLES

Preliminary experiments were performed on simplified experimental prototype systems. In one series of experiments, the combustion of the irradiated targets was investigated. Although activity is produced within a small fraction of one deuteron range in the graphite, some diffusion of the $^{13}$N-activity away from the target surface may occur due to recoil energy imparted to the $^{13}$N nucleus and temperature gradients in the graphite target. In order to minimize this diffusion, the experiments were performed using low porosity graphite. First, the target was irradiated with a Tandem Cascade Accelerator (TCA) deuteron beam (1.2 MeV, 5 μA for 2 minutes) to produce 490 μCi of $^{13}$N activity. After each irradiation, a measured amount of oxygen gas was admitted into the target chamber. The chamber was then pressurized to 1 atmosphere with He gas, the recirculation pump was started, and the RF coil was energized in order to combust the graphite.

Following combustion, the graphite target was removed from the target chamber and placed in the well of a radioisotope calibrator (Capintec CRC-12) to determine the residual activity remaining in the lattice. The target was also weighed and measured, to determine the mass combusted and the approximate amount of graphite burned from the front face. The mass of graphite combusted was found to be proportional to the amount of oxygen admitted to the target chamber. Oxygen was aimed at the front face of the target and combustion took place primarily on the front face. Mass was lost almost entirely from the front face and circumference of the targets, and not from the back surface or threaded stem. The ratio of loss of the front face to loss at the circumference varied from 1:1 to 7:1. To reduce loss at the circumference it is possible to coat the sides of the target with a non-combustive material such as boron nitride.

Figure 6:
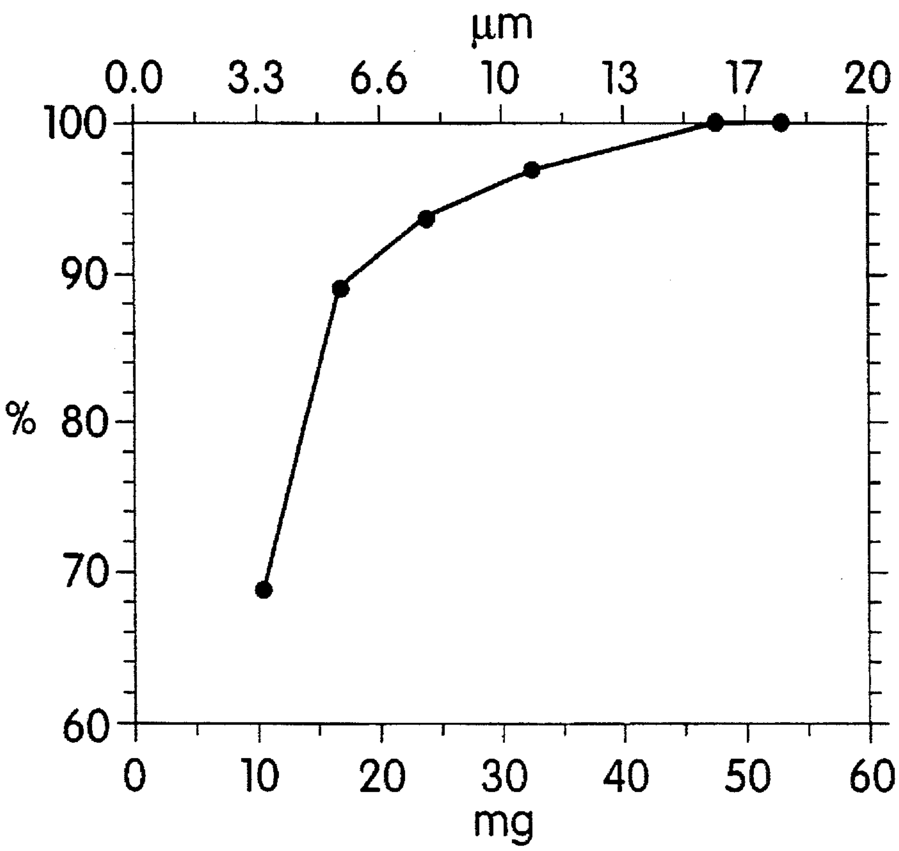
FIG. 6 is a graph of the percentage of activity extracted from a graphite target plotted against the thickness combusted (top axis) and against the mass combusted (bottom axis), for the system of FIG. 1.

FIG. 6 shows that approximately 40 mg of graphite must be combusted to extract 99% of the activity produced in the target. The corresponding thickness of graphite removed from the front face of the target is 13.2±2.4 μm, which is approximately equal to one deuteron range at 1.2 MeV. In order to account for the possibility of non-uniform combustion of the target surface, 25 μm was chosen as the nominal thickness that must be removed in order to ensure extraction of greater than 99% of the induced $^{13}$N activity.

An estimate of expected target lifetime may be obtained from the number of combustion cycles required to reduce 6.4 mm target thickness by a factor of two. Using the conservative value discussed above of a 25 μm decrease in thickness per combustion yields a useful life of about 130 combustion cycles. For a production schedule such as that required in a busy clinical PET Center, with 6 Patients per day and two $^{13}$N-ammonia injections per patient, target replacement would be required every 2 weeks. Target replacement is a routine procedure requiring less than one hour of system downtime. A series of experiments was performed using both low porosity and ECL graphite to determine the effect of graphite porosity on ¯N extraction efficiency. The results of these experiments are summarized in Table II. For all measurements, activity was extracted under nearly identical conditions after graphite irradiation for 1 minute with a 2.4 MeV, 5 μA deuteron beam. The residual activity remaining in the ECL graphite target after combustion was significantly higher than that remaining in the low-porosity graphite indicating that porosity may adversely affect extraction efficiency. The low porosity graphite was determined from these experiments to be the preferred target material.

TABLE II

| Target ID | $O_2$ Fill (std-ml) | Mass Change (mg) | % Residual Activity |
|---|---|---|---|
| | | low porosity graphite | |
| 1 | 270 | 127 | 1.6 |
| 2 | 280 | 140* | 1.7 |
| 3 | 280 | NM | 0.6 |
| | | ECL graphite | |
| 4 | 280 | 147† | 7.6 |
| 4 | 280 | 140† | 5.5 |

NM-not measured
*Mass change and residual activity measured after six consecutive combustions with the same combustion parameters. Listed value is average mass change.
†Listed value is average mass change over two combustions with the same parameters.

An important target lifetime parameter is the dependence of extraction efficiency on the number of irradiation and combustion cycles and total mass removed. The extraction of activity from the low porosity graphite irradiated with 2.4 MeV deuterons was found to be very reproducible. Target 2 listed in Table II was used for 6 consecutive irradiation and combustion cycles in which approximately 125 μm was removed from the front face of the target per combustion. The extraction efficiency after the last irradiation was still greater than 98%. Since at 1.2 MeV beam energy the amount of graphite required to be combusted will decrease from approximately 125 μm to 25 μm, this result seems to indicate that the target should be re-usable for at least 30 irradiation and combustion cycles without significant degradation in extraction efficiency.

Experiments were also performed using the TCA to determine the effects of elevated temperature on target performance. Of particular concern were the rate of target outgassing and the rate of diffusion of $^{13}N$ activity into the graphite lattice at elevated temperatures. The contemplated design parameters for the $^{13}N$-ammonia generator (1.2 MeV, 220 μA) will produce a beam power load on target of approximately 265 watts. Since the TCA beam transport optics are designed for higher energy, it was not possible to deliver this beam power at 1.2 MeV. Therefore, two experiments were designed to simulate the actual high power irradiation conditions.

First, the graphite target was irradiated with a high energy 225 W deuteron beam (3.2 MeV, 70 μA) for 10 minutes. During bombardment, the target temperature measured with the thermocouple increased to 1030° C. and stabilized at this value. The calculated equilibrium temperature for this beam power, assuming radiative cooling only, is 1110° C. indicating that radiation is the primary target cooling mechanism, and that only approximately 20% of the beam power is removed by water cooling of the target stem. For a 265 watt deuteron beam, the radiative equilibrium temperature will be 1170° C., and the expected operating temperature will be 1090° C. The target vacuum pressure remained well within the required limits for accelerator operation (less than $10^{-5}$ torr) during bombardment with the 225 W beam. This seems to indicate that the target outgassing rate during bombardment at approximately the required power level is within acceptable limits. In addition, the measured yield was in good agreement with the calculated yield for these bombardment parameters, seeming to indicate that loss of $^{13}N$ activity due to outgassing during bombardment did not occur. This result is consistent with published data which show that nitrogen is first released from heated graphite in vacuum at a temperature of 1700° C. (see Kohl, Materials and Techniques for Electron Tubes, Vol. 1, Reinhold, New York, 1960, 66.)

A second experiment was performed in which the target temperature was raised with the RF heating coil during irradiation with a low current, low energy beam. The target was heated to approximately 900° C. for a total of 6 minutes. During the first 4 minutes of heating the target was bombarded with a 1.2 MeV, 5 μA deuteron beam. The expected yield for these irradiation conditions is 914±9 μCi. The measured yield after target irradiation at 900° C. was 913 μCi, indicating that there was no significant loss of $^{13}N$ activity during high temperature bombardment. Extraction of the activity using the technique described earlier gave an extraction efficiency identical to that obtained with a cold target.

In another experiment, graphite targets approximately 11×16×0.8 $mm^3$ in size were mounted on an aluminum target holder in vacuum and irradiated with an 8 μA 8 MeV deuteron beam for 2 minutes. About 15 mCi of $^{13}N$ was produced in the target under these irradiation conditions.

At the end of bombardment, the radioactive target was placed in the open tube of a furnace (Lindberg, WI. Model 59246) which had been previously purged with pure oxygen gas at elevated temperature (typically 700° C.). The furnace tube was closed and the oxygen gas was recirculated through a loop containing $^{13}N$ activity traps with a peristaltic pump at 2–3 psi above atmospheric pressure. Immediately following the introduction of the target into the furnace, the temperature was raised to the desired final temperature (typically 850° C.). When the final temperature was reached, the recirculation was stopped, the traps removed, and the amount of trapped activity measured. In some experiments, a gas sample was also withdrawn for analysis. In addition, following some of the experiments, the uncombusted graphite was removed from the furnace in order to weigh it and measure the residual activity.

An ion chromatography (IC) system was used for the analysis of liquid solutions eluted from the traps. The IC system consisted of a Waters Associates Action Analyzer/Powerline System equipped with a Rheodyne injector with a 50 μl loop, a conductivity detector model 431, a NaI radioactivity detector, and PC integration software for data analysis. An activity balance of the eluted counts from each column was performed to determine the quantitative nature of the analysis.

Twelve different traps were used to study the trapping efficiency of the $^{13}N$ produced by combusting graphite in oxygen. The trapping media and the absorbing solution coated on the media are listed in Table III. Traps 1–7 proved ineffective, while traps 8–10 trapped 32–50% of the activity released from the graphite. Yields reported are decay corrected unless otherwise noted. Trap 11 was by far the most effective, with high trapping efficiency for oxides of nitrogen produced in different experimental setups. Trap 12 was not used as the high sodium hydroxide concentration dissolved the silica gel. IC analysis was carried out on eluted samples from each type of trap. In most cases, the majority of the trapped activity was nitrite. The only exceptions were utilizing traps 3, 7, and 10 where more nitrate was formed.

TABLE III

Description of the trapping media and modifiers used for the study of $^{13}N$-gases

| Trap | Media (g) | Modifier (mL) | Description |
|---|---|---|---|
| 1 | Aluminum shavings (0.72 g) | none | metal |
| 2 | Soda Lime (2 g) | none | Fisher S201-3 |
| 3 | Silica gel (2 g) | $CuSO_4/H_2SO_4$ | Tewson et al. |
| 4 | Silica gel (05) | none | Merck 9385 60°, 230–400 mesh |
| 5 | Silica gel (1.5 g) | water (2 mL) | Merck 9385 60°, 230–400 mesh |
| 6 | Aluminum oxide (1.5 g) neutral | water (2 mL) | Alfa 032480 –60 mesh |
| 7 | Silica gel (1.5 g) | 3% $H_2O_2$ (1.5 mL) | Aldrich 21,676-3 |
| 8 | Silica gel (1.5 g) | 0.01N $HNO_3$ (1.6 mL) | Fisher SC A 200-500 |
| 9 | Silica gel (1.5 or 2.0 g) | 3% HCOOH (1.5–2 mL) | Aldrich 25,136-4 |
| 10 | Silica gel (2 g) | 5% HCOOH (2 mL) solid phase (SP) | Aldrich 25,136-4 |
| 11 | Silica gel (2 g) | 5% NaOH (2 mL) solid phase (SP) | Fisher SS 254-500 dilution |
| 12 | Silica gel (2 g) | 10% NaOH (2 mL) solid phase (SP) | Fisher SS 254-500 dilution |

Five experiments performed with a Type 11 trap at a gas flow rate of 260–300 std-ml/min produced a trapping efficiency of 71±7% of the activity released from the graphite target. Gas samples were withdrawn from the recirculating $^{13}N$ gas system and injected into the column of a gas chromatograph (Varian Model 3700, equipped with a NaI crystal for radioactivity detection). It was found that 20% of the gas produced in the burning was $^{13}NN$ gas produced by the combustion. The fraction of activity that could be eluted from a Type 11 trap using 2–3 ml of distilled water was approximately 90%.

The $^{13}N$ trap developed was tested with the induction heated graphite target. These experiments used a simplified gas recirculation system with two traps in series, Following deuteron beam bombardment (2.4 MeV, 5 μA for 1 minute to produce 2.22 mCi), the gate valve between the target chamber and the accelerator beam line was closed and the valves between the target and the gas recirculation loop were opened. Approximately 275 std-ml of oxygen gas were admitted into the loop, raising the pressure to 440 torr. Helium gas was then added to bring the total pressure to 2–3 psi above one atmosphere. A peristaltic pump provided a flow rate in the loop of 280–360 std-ml/min, A thin layer of graphite was then combusted as described earlier. The activity in the traps was continuously monitored by placing them in the well of a radioisotope calibrator. The trapped activity reached a maximum value approximately 3.5 minutes after the RF heating coil was energized, after which the traps were separated and the activity in each trap was measured. In several experiments, the graphite target was removed following combustion in order to measure the residual activity.

A series of 8 trapping experiments was performed using two Type 11 traps and the irradiation and combustion conditions given above. The average trapping efficiency (defined as the ratio of trapped activity to activity released from the graphite) obtained in the experiments is 78±3.5%. In all cases, 95% or more of the total trapped activity was found in the first trap, indicating that a single trap is sufficient. In one experiment, 9.5 mCi of $^{13}N$ were produced in the target and a trapping efficiency of 82% was achieved. Both low-porosity and ECL graphite samples were rated and no significant difference in trapping efficiency was found. One low-porosity target was irradiated and combusted a total of six consecutive times. The trapping efficiency remained high over this number of combustion cycles.

The trapping efficiency was found to depend strongly on the gas flow rate in the target loop: trapping with a flow rate of 140 std-ml/min yielded a trapping efficiency of only 41%, or approximately half the trapping efficiency obtained with the 280–360 std-ml/min flow rate used in the experiments described above. No difference in trapping efficiency was found within this higher range of flow rates. The rate of combustion and trapping was found to decrease with decreasing partial pressure of oxygen. Since the total amount of $O_2$ gas is fixed by the mass of graphite to be combusted, care must be taken to minimize the total loop volume in order to maintain high $O_2$ partial pressure.

Experiments were performed in order to determine whether removal of $^{14}N$ from the graphite lattice would reduce the fraction of activity released as $^{13}NN$, thereby increasing trapping efficiency. A sample of ECL graphite was heat-treated in a commercial vacuum furnace (Solar Atmospheres, Inc., Souderton, Pa.) at a temperature of 2200° C. in accordance with published data which show that absorbed nitrogen is releases from graphite at 1700°–2150° C. (see Kohl, supra). The trapping efficiency for the heat-treated ECL graphite was 72%, indicating that heat-treatment to remove absorbed $N_2$ did not result in improved trapping efficiency.

An experiment was performed to demonstrate that the extracting and trapping performance reported above can be extrapolated to high $^{13}N$ activities. The graphite target was irradiated with the TCA beam to produce approximately 200 mCi of $^{13}N$-activity. Oxygen was admitted to the target flow loop which included a single Type 11 trap and the RF coil was energized when the activity in the target had decayed to 150 mCi. The extraction efficiency measured in this experiment was 99% and the decay-corrected trapping efficiency was within two standard deviations of the efficiencies reported above for the smaller of $^{13}N$ activity. The measured peak in real trapped activity (not decay-corrected) was 83 mCi. As discussed below, we have shown that this amount of trapped activity will yield greater than 34 mCi of $^{13}NH_3$.

A prototype system for the production of $^{13}N$-ammonia was constructed. The system consists of a 5 ml conical vial (Reactivial™) modified with a vertical air condenser on top and two side arms to add nitrogen gas and inject the trap eluate containing the $^{13}NO_2$. A side-arm condenser about 3.8 cm below the top of the reflux vertical tube was used to direct the stream of nitrogen carrying the $^{13}NH_3$ into a receiver. The receiver was another 5 ml Reactivial™ modified by the addition of a side arm. This side arm was used to place an additional trap in the gas vent, if required. All connecting lines and joints were made of teflon. Before the start of a synthesis, the first vessel was loaded with 0.3–0.4 gm of a Raney-Nickel slurry (Aldrich 22,167–8) and 100 μl of a 50% NaOH solution (Fisher SS254-500). The collecting vessel was loaded with about 1.0 ml of 0.1N HCl, and the side arm of this vessel was connected to a syringe containing 2 g of boric acid (Fisher A-73) which served as a scrubber for any $^{13}NH_3$ that could escape.

After combustion, the $^{13}N$ activity collected on the traps was eluted in less than one minute directly into the Raney-Nickel/NaOH reducing mixture. The nitrogen gas flow was started and first vessel heated rapidly with a heat gun. After 2–4 minutes, the activity distilled in the 0.1N HCl was counted and analyzed by ion chromatography. Four runs were carried out using the final ammonia production system. Analysis of the activity by IC confirmed the production of $^{13}NH_3$. The measured ammonia production efficiency (relative to amount of eluted activity delivered to the apparatus) was 64±10%.

The total decay corrected yield of activity induced in the target to ammonia is the product of the extraction efficiency (99%), trapping efficiency (78%), eluting efficiency (90%) and ammonia conversion efficiency (64%). The overall decay corrected ammonia yield determined in the Phase I experiments is thus 44%. In these experiments, the minimum time for conversion of target activity to ammonia was 8.5 minutes (3.5 minutes for extraction and trapping and 5 minutes for eluting and conversion to ammonia). Using the measured decay corrected ammonia yield and allowing a total conversion time of 10 minutes, 136 mCi of $^{13}N$ must be produced in the graphite target to yield 30 mCi of $^{13}NH_3$.

In further experiments, Raney-Nickel catalyst was mixed with the silica gel/sodium hydroxide trapping medium. Raney-Nickel was selected as a reducing agent because it can be used in the solid phase. This material trapped oxides of nitrogen with as high efficiency as silica gel/NaOH alone: in an experiment where 2.4 gm of Raney-Nickel/NaOH/silica were placed in a stainless steel tube, 80% of the extracted $^{13}N$ activity was trapped. Up to 26% of the activity has been converted to ammonia simply by saturating the trap material with water and heating the trap in a steam of nitrogen gas. Other preliminary experiments improved the conversion efficiency by heating the trap to 200° C. and passing 5% hydrogen in nitrogen (saturated with water) through the trap. This experiment was performed four times with an average of 37% of the activity produced in the target converted to $^{13}NH_3$, as determined by radioactivity monitoring and ion chromatography.

The method of generating radioisotopes presented in the present application has the advantage of operating relatively quickly, i.e., around ten minutes or less. This is important, as the radioisotopes used in PET can have short half lives. For example, $^{13}$N has a half life of about ten minutes.

Further, since the apparatus presented can operate with an uninterrupted path between the accelerator tube and the target (i.e., without a window), the accelerator need not accelerate the deuterons to as high an energy. Accelerators producing beam energies of 2.2 MeV or less, may therefore be used. Such accelerators are lighter, more compact and less expensive than might otherwise be required. This invention, however, is not restricted to low energy applications. Also, other types of accelerators can be used, such as TCAs, RF accelerators, electrostatic accelerators, cyclotrons and the like.

Because the cartridges 88 are ganged and mounted all at the same time, the amount of maintenance is reduced. Also, the fact that the catalyst is solid simplifies the dual trapping/synthesis operation of the catalyst. It is estimated that the cost of the system will be less than a single year's supply of $^{82}$Rb, and that operating costs will be minimal.

The apparatus and techniques presented in the above description are also applicable to other radioisotopes, and the isotopes generated may be used for purposes other than PET. Other target materials and other particle beams may be used. For example, it would be possible to generate $^{13}$N from a $^{13}$C-enriched target and a proton source. The invention is also applicable to targets which are heated but not combusted to release the radioisotope. For example, it is also applicable to boron-containing targets, such as boric oxide targets, to produce $^{11}$C. In such an embodiment, an accelerator may bombard a $^{10}$B-containing target with deuterons, or it may bombard a $^{11}$B-containing target with protons. A heater then applies heat to the target to melt the boron containing compound, and a sweep gas, such as helium, is pumped past the target to extract the $^{11}$C. This extraction operation may be performed with the target in the same position that it occupied when it was bombarded, and it may be bombarded again in situ after it has been left to resolidify.

Furthermore, it may be possible to heat the target for combustion in ways other than induction heating, such as by the use of a laser, by resistive heating, or by using the particle beam itself. If the beam itself is used, it may be possible to bombard the target and combust it in one continuous process, rather than combusting after bombarding in a batch process as described above. However, this process would likely either require a window, or a differential pumping arrangement to keep any gases present in the chamber from entering the tube of the CCA.

While there have been shown and described what are at present considered the preferred embodiments of the present invention, it will be obvious to those skilled in the art that various changes and modifications may be made therein without departing from the scope of the invention as defined by the appended claims.

What is claimed is:

1. A method of producing oxides of $^{13}$N, comprising:

bombarding a face of a carbon-containing target with high energy particles to generate $^{13}$N in a surface layer of the bombarded face of the target, and combusting the target in gaseous oxygen to extract oxides of $^{13}$N from the target, the combusting being primarily confined to the depth of the surface layer containing the $^{13}$N.

2. The method of claim 1 wherein the combusting step includes the step of controlling the combustion of the target so as to be primarily confined to said surface layer.

3. The method of claim 2 wherein the step of controlling controls the rate of combustion.

4. The method of claim 3 wherein the step of controlling the rate of combustion is performed by controlling the partial pressure of the oxygen.

5. The method of claim 2 wherein the step of controlling is performed by controlling the quantity of oxygen available to the target during the step of combusting.

6. The method of claim 2 wherein the step of controlling is performed by controlling the target temperature during the step of combusting.

7. The method of claim 1 wherein the step of combusting is performed by induction heating.

8. The method of claim 1 wherein the carbon-containing target is a graphite target.

9. The method of claim 8 wherein the target comprises low porosity graphite.

10. The method of claim 1 wherein the oxygen flow is directed at the bombarded face of the target to primarily confine combustion to the bombarded face.

11. The method of claim 1 further including the step performed before the bombarding step of coating unbombarded surfaces of the target with a non-combustible material.

12. The method of claim 11 wherein the step of coating uses boron nitride as the non-combustible material.

13. The method of claim 1 further including the step of reusing the target in further bombarding and combusting steps.

14. The method of claim 1 wherein the step of combusting is performed after the step of bombarding.

15. The method of claim 1 wherein the step of bombarding bombards the target via an unobstructed path.

16. The method of claim 1 wherein the step of bombarding is performed at a beam energy of 2.2 MeV or less.

17. The method of claim 1 wherein the carbon-containing target comprises primarily $^{12}$C and the step of bombarding bombards the target with deuterons.

18. The method of claim 1 wherein the carbon-containing target comprises primarily $^{13}$C and the step of bombarding bombards the target with protons.

19. The method of claim 1 wherein the steps of bombarding and combusting overlap in time in a continuous process.

20. The method of claim 1 further including the step of trapping the oxides of $^{13}$N in a trap.

21. The method of claim 20 further including the step of converting the oxides of $^{13}$N into $^{13}$N-Ammonia.

22. The method of claim 21 further including the step of washing the trap to remove the oxides from the trap and wherein the step of converting the oxides of $^{13}$N into $^{13}$N-Ammonia includes reducing the oxides removed from the trap to form $^{13}$N-Ammonia.

23. The method of claim 21 wherein the step of trapping and the step of converting are performed within the trap.

24. The method of claim 1 wherein the step of combusting is performed by induction heating, and further including the step of controlling combustion of the target by controlling the quantity of oxygen available to the target during the step of combusting, wherein the step of bombarding bombards a carbon-containing target to produce the $^{13}$N in a surface layer of the target, and the step of combusting is primarily confined to the surface layer, wherein the step of combusting is performed after the step of bombarding, further including the steps of trapping the oxides of $^{13}N$ in a trap, and converting the oxides of $^{13}N$ trapped in the step of trapping into $^{13}N$-ammonia, and further including the step of reusing the target in further bombarding and combusting steps.

25. A method of producing $^{13}N$-ammonia, comprising:

supplying a gaseous mixture containing oxides of $^{13}N$, trapping the oxides of $^{13}N$ from the mixture in a trap, and converting the oxides of $^{13}N$ trapped in the step of trapping into $^{13}N$-ammonia.

26. The method of claim 25 wherein the step of converting is performed using a reducing agent.

27. The method of claim 26 wherein the reducing agent is Raney-Nickel.

28. The method of claim 25 wherein the step of trapping and the step of converting are performed within the trap.

29. The method of claim 25 wherein the trap comprises silica gel and sodium hydroxide.

30. The method of claim 29 wherein the trap further comprises Raney-Nickel.

31. A method of producing a radioisotope, comprising:

bombarding a target with high energy particles to generate atoms of a radioisotope in the target, combusting the target in gaseous oxygen to extract the atoms of the radioisotope from the target, said step of combusting being performed by induction heating, controlling combustion of the target by controlling the quantity of oxygen available to the target during the step of combusting, the step of bombarding the target to produce the radioisotope in a surface layer of the target, and the step of combusting being primarily confined to the surface layer, the step of combusting being performed after the step of bombarding, and reusing the target in further bombarding and combusting steps.

32. A method of producing a radioisotope, comprising:

bombarding a target with high energy particles to generate atoms of a radioisotope in the target, stopping the bombarding for a period of time, applying heat to the target to extract the atoms of the radioisotope from the target during the stopping step, and reusing the target in further bombarding and heat applying steps.

33. The method of claim 32 wherein the steps of bombarding and applying heat are applied to a boron-containing target to produce $^{11}C$.

34. The method of claim 33 wherein the steps of bombarding and applying heat are applied to a boric oxide target to produce $^{11}C$.

35. The method of claim 33 wherein the step of bombarding is performed with deuterons and the steps of bombarding and applying heat are applied to a $^{10}B$-containing target to produce $^{11}C$.

36. The method of claim 33 wherein the step of bombarding is performed with protons and the steps of bombarding and applying heat are applied to a $^{11}B$-containing target to produce $^{11}C$.

37. The method of claim 32 wherein the steps of bombarding and applying heat are applied to a carbon-containing target to produce $^{13}N$.

38. A method of producing a radioisotope, comprising:

bombarding a target with high energy particles to generate atoms of a radioisotope in the target, and heating the target by induction to extract the atoms of the radioisotope from the target.

39. The method of claim 38 further including the step of reusing the target in further bombarding and heating steps.

40. The method of claim 38 wherein the steps of bombarding and heating are applied to a boron-containing target to produce $^{11}C$.

41. The method of claim 40 wherein the steps of bombarding and heating are applied to a boric oxide target to produce $^{11}C$.

42. The method of claim 40 wherein the step of bombarding is performed with deuterons and the steps of bombarding and applying heat are applied to a $^{10}B$-containing target to produce $^{11}C$.

43. The method of claim 40 wherein the step of bombarding is performed with protons and the steps of bombarding and applying heat are applied to a $^{11}B$-containing target to produce $^{11}C$.

44. The method of claim 38 wherein the steps of bombarding and heating are applied to a carbon-containing target to produce $^{13}N$.

* * * * *